(12) United States Patent
Buckner

(10) Patent No.: US 9,217,518 B2
(45) Date of Patent: Dec. 22, 2015

(54) FOLDING HOSE STORAGE RACK

(71) Applicant: Don M. Buckner, Okahumpka, FL (US)

(72) Inventor: Don M. Buckner, Okahumpka, FL (US)

(73) Assignee: VAC-TRON EQUIPMENT, LLC, Okahumpka, FL (US)

( * ) Notice: Subject to any disclaimer, the term of this patent is extended or adjusted under 35 U.S.C. 154(b) by 134 days.

(21) Appl. No.: 14/050,622

(22) Filed: Oct. 10, 2013

(65) Prior Publication Data
US 2015/0102184 A1    Apr. 16, 2015

(51) Int. Cl.
*A47F 5/08* (2006.01)
*F16L 3/04* (2006.01)
*F16L 3/00* (2006.01)

(52) U.S. Cl.
CPC .... *F16L 3/04* (2013.01); *F16L 3/00* (2013.01)

(58) Field of Classification Search
CPC ...... A47B 81/005; B60R 7/10; A47F 5/0823; A47G 7/045; Y10T 16/50; A47L 9/009
USPC .................................. 248/89–92, 339, 290.1
See application file for complete search history.

(56) References Cited

U.S. PATENT DOCUMENTS

| | | | | |
|---|---|---|---|---|
| 143,228 A | * | 9/1873 | Doyle | 248/240 |
| 677,163 A | * | 6/1901 | Wirt | 248/90 |
| 839,729 A | * | 12/1906 | Chance | 248/290.1 |
| 933,069 A | * | 9/1909 | Gibbs | 248/90 |
| 965,660 A | * | 7/1910 | Samson | 248/290.1 |
| 1,023,218 A | * | 4/1912 | Mueller | 248/89 |
| 1,213,808 A | * | 1/1917 | Page | 248/290.1 |
| 4,650,144 A | * | 3/1987 | Conrad | 248/290.1 |
| 5,054,723 A | * | 10/1991 | Arnold | 248/65 |
| 5,078,276 A | * | 1/1992 | Rogge et al. | 211/18 |
| D482,557 S | * | 11/2003 | Shih | D6/553 |

OTHER PUBLICATIONS

Keyes Life Safety Compliance, Sep. 1, 2009, http://keyeslifesafety.com/removal-of-occupant-use-fire-hoses/.*

* cited by examiner

*Primary Examiner* — Jeanette E Chapman
*Assistant Examiner* — Daniel Kenny
(74) *Attorney, Agent, or Firm* — Matthew G. McKinney, Esq.; Allen, Dyer, Doppelt, Milbrath & Gilchrist, P.A.

(57) ABSTRACT

A folding hose storage rack is disclosed. The rack includes two spaced apart support members with each support member having a vertical member configured to rotate about a vertical axis, an upper arm extending outward from the vertical member, a lower arm extending outward from the vertical member, where the lower arm is aligned under the upper arm, and a boss along a lower edge of the lower arm. In addition, the rack includes a retainer having intersecting slots such that each slot is configured to receive the boss to prevent the support member from rotating. Each support member is configured to lift up to remove the boss from the intersecting slots, rotate to a desired position, and lower down to insert the boss into a desired slot of the intersecting slots. The intersecting slots form a T-configuration to rotate and secure each supporting arm to either side.

9 Claims, 3 Drawing Sheets

FOLDING HOSE STORAGE RACK

I. FIELD OF THE INVENTION

The present invention relates generally to a folding hose storage rack.

II. BACKGROUND

Industrial vacuum equipment has dozens of wet and dry uses such as hydro excavation, air excavation and vacuum excavation. In addition, the equipment can be used for directional drilling slurry removal, industrial clean-up, waste clean-up, lateral and storm drain clean-out, oil spill clean-up and other natural disaster clean-up applications. The vacuum systems may be mounted to a truck or trailer and are typically powered by gas or diesel engines.

The vacuum systems include a debris tank that is used to collect the material using a large diameter hose. The hoses are typically long and rigid with spiral wound corrugations along the length of the hose. Accordingly, the hoses are generally heavy and cumbersome to handle. The hoses are conventionally stored on the rear of the debris tank using hooks to coil the hoses and secure to the tank.

Often times the vacuum equipment is needed at several proximate locations. Thus, the hoses are required to be loaded up and stored on the rear of the debris tank when traveling between locations. However, it is time consuming to coil the hoses and secure to the rear of the debris tank. Instead, there is a need in the art for a storage rack that is efficient to use for temporily storing a vacuum hose for transport between proximate locations. There is also a need for a storage rack that is easy to deploy and store when not needed.

III. SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In a particular embodiment, a folding hose storage rack is disclosed. The rack includes two spaced apart support members with each support member having a vertical member configured to rotate about a vertical axis, an upper arm extending outward from the vertical member, a lower arm extending outward from the vertical member, where the lower arm is aligned under the upper arm, and a boss along a lower edge of the lower arm. In addition, the rack includes a retainer having intersecting slots such that each slot is configured to receive the boss to prevent the support member from rotating. Each support member is configured to lift up to remove the boss from the intersecting slots, rotate to a desired position, and lower down to insert the boss into a desired slot of the intersecting slots. The intersecting slots form a T-configuration to rotate and secure each supporting arm to either side.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

IV. BRIEF DESCRIPTION OF THE DRAWINGS

V. DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
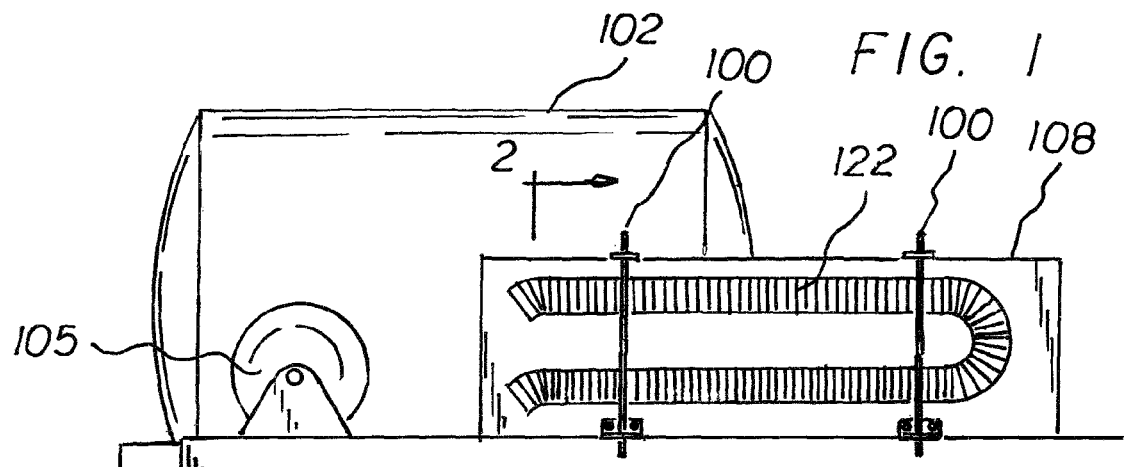
FIG. 1 is a front elevational view of a folding hose storage rack loaded with a hose.
Figure 2:
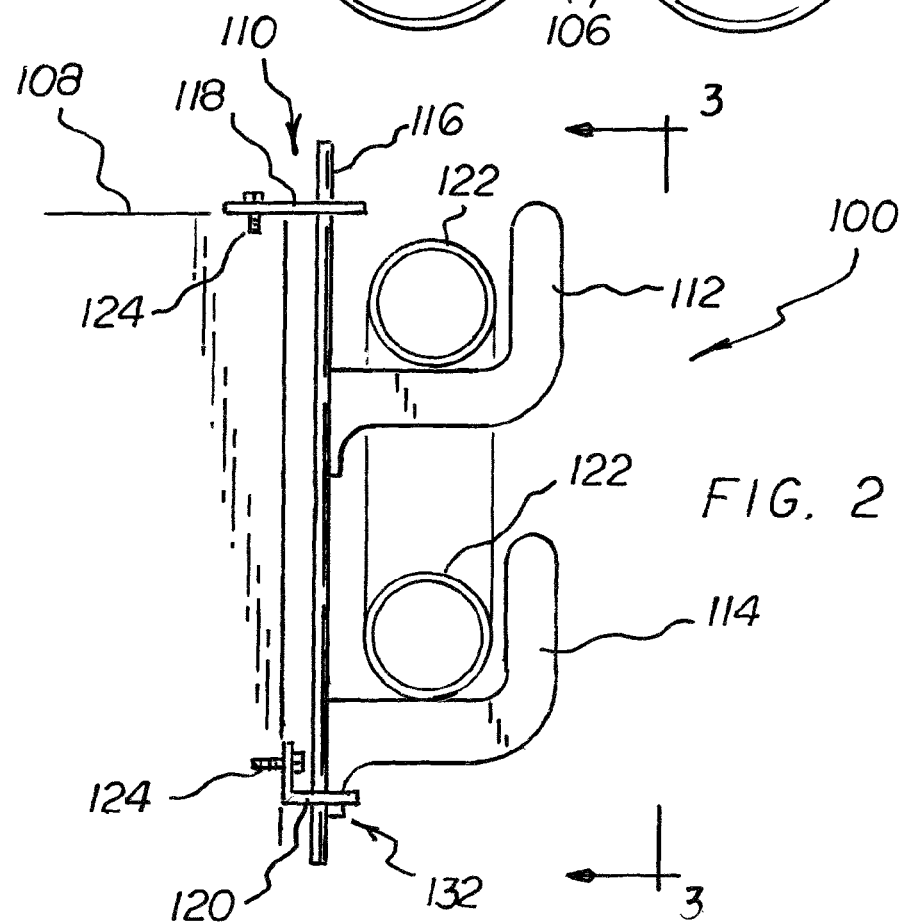
FIG. 2 is a side elevational view of the hose storage rack shown in FIG. 1 taken in the direction of lines 2-2 and loaded with the hose.

Referring to FIGS. 1 and 2, a particular illustrative embodiment of a folding hose storage rack is disclosed. The hose rack has the ability to fold open to support a hose 122, and to fold close for storage as explained below. The hose 122 that is intended to be used with the rack is a hose 122 most often used with industrial vacuum type equipment. The vacuum equipment includes a debris tank 102 with a suction port that exits a closed front end of the debris tank 102 and is configured to be in communication with a pump or blower (not shown). An inlet port is positioned through the door at the rear of the debris tank 102 and is used to connect the suction hose 122 to the debris tank 102. The debris tank 102 and equipment 108 is mounted to a mobile trailer 104 (or truck) on wheels 106 and used to vacuum large amount of debris and liquids from a site into the debris tank 102. Accordingly, the diameter of the hose 122 may be six inches or larger and constructed of relatively heavy material. Thus, the hose 122 can be difficult and awkward to handle.

The hose 122 is typically stored on the rear of the debris tank 102 by winding around hooks. When the hose 122 is secured to the rear of the debris tank 102, the hose 122 is protected from the wind as the trailer 104 is pulled at high speeds down the road to various locations. However, often times the vacuum equipment is needed at various locations that may only be a few hundred feet apart. Thus, it is time consuming to secure the hose 122 to the rear of the debris tank 102 when moving short distances. Accordingly, the folding rack provides an efficient device to quickly and temporarily load the hose 122 on to the rack and to drive to the next location and unload the hose 122 quickly. In use, the hose 122 is draped over the rack in a serpentine manner from top to bottom of the rack. When the folding rack is not needed, it quickly folds closed and out of the way.

The rack includes two spaced apart support members 100. Each support member 100 includes a vertical member 116 configured to rotate about a vertical axis. An upper arm 112 extends outward from the vertical member 116, and a lower arm 114 extends outward from the vertical member 116, where the lower arm 114 is aligned under the upper arm 112.

A boss 132 is disposed along a lower edge of the lower arm 114. In a particular illustrative embodiment, the boss 132 is formed as part of the lower arm 114 and is squared off where the boss 132 joins the vertical member 116. Accordingly, the construction of the boss 132 does not have any points of weakness at the connection points that typically are subject to failure.

Figure 5:
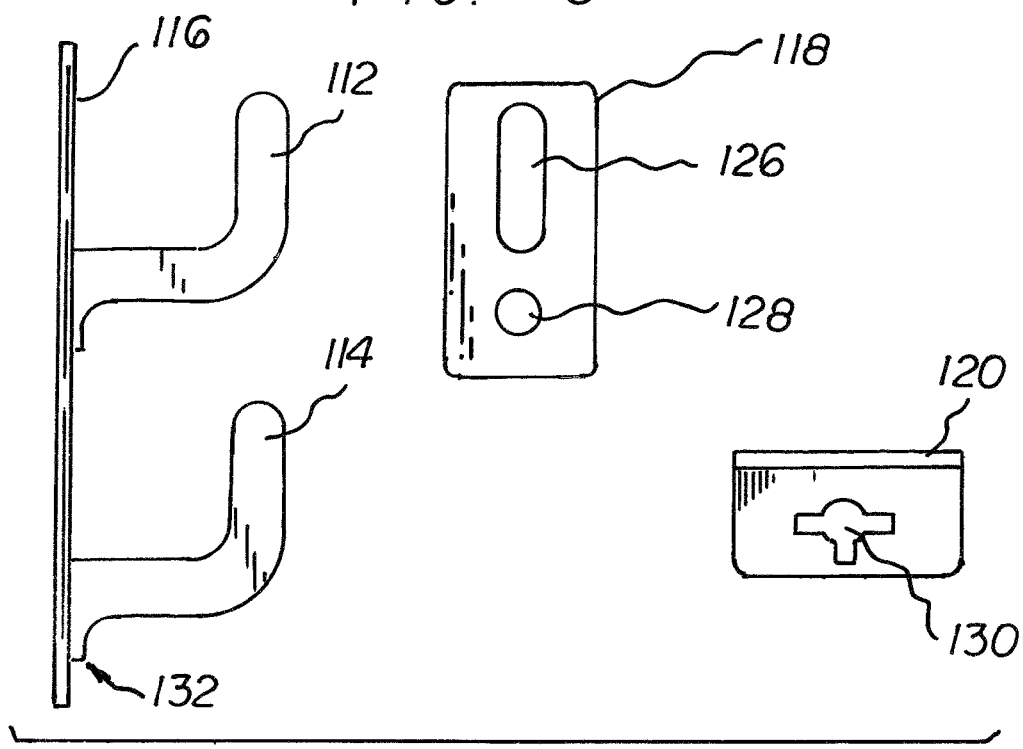
FIG. 5 is an exploded view of the hose storage rack shown in FIG. 3 taken in the direction of lines 5-5 with a side elevational view of a support member of the rack.
Figure 6:
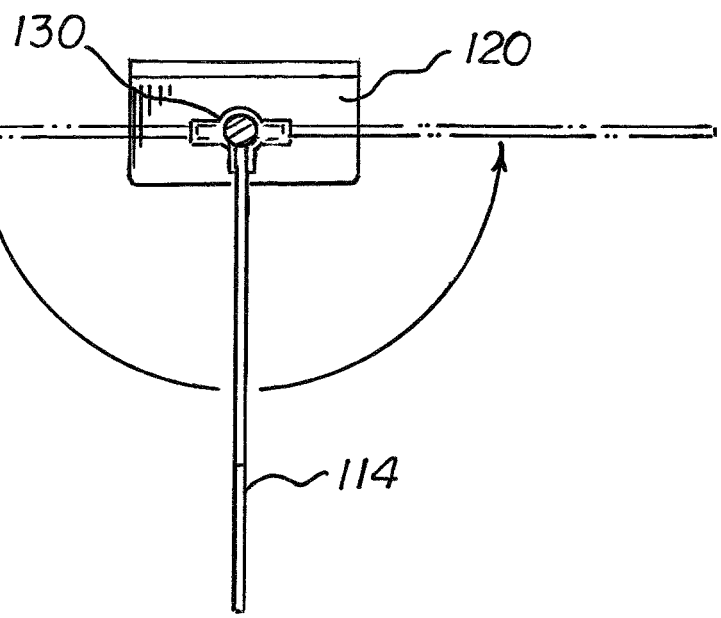
FIG. 6 is a top view of the hose storage rack shown in FIG. 3 taken in the direction of lines 6-6.

A retainer 120 is fixedly secured to the equipment 108 using screws 124 or bolts and is used to position the support members 100. The retainer 120 is generally an angle bracket having two legs orthogonal to one another. A vertical leg of the retainer 120 is used to secure the retainer 120 to equipment 108 and a horizontal leg of the retainer 120 includes intersecting slots 130 that form a cross pattern as shown in FIGS. 5 and 6. Each slot is approximately ninety (90) degrees to the adjacent slot (i.e., orthogonal) and is each configured to receive the boss 132 to prevent the support member 100 from rotating. The vertical member 116 is configured to slide down into the intersecting slots 130 of the retainer 120 where the lower edge of the lower arm 114 rests on the retainer 120. The vertical member 116 is generally cylindrical in shape such as a rod shape.

Figure 3:
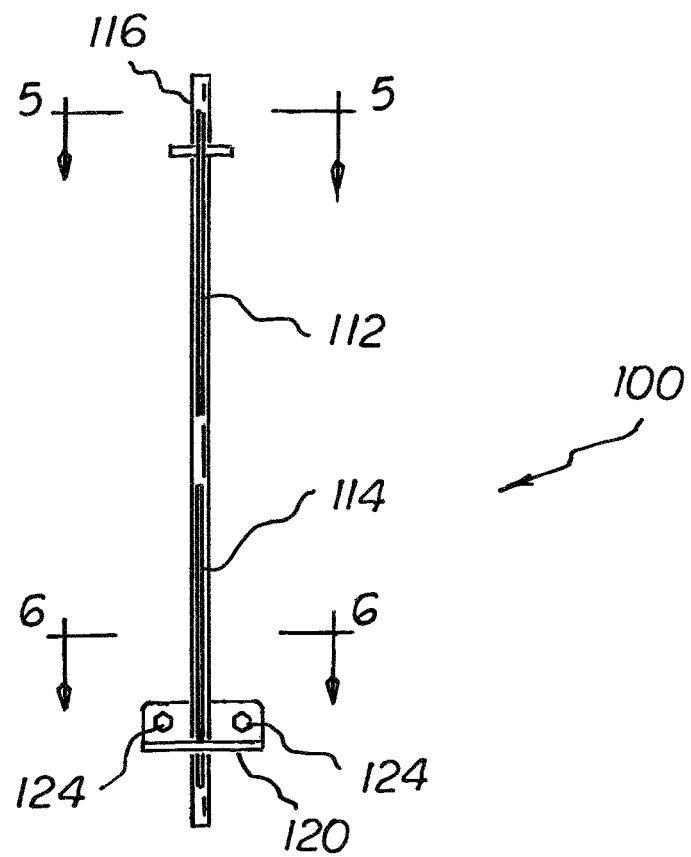
FIG. 3 is a front elevational view of the hose storage rack shown in FIG. 2 taken in the direction of lines 3-3.
Figure 4:
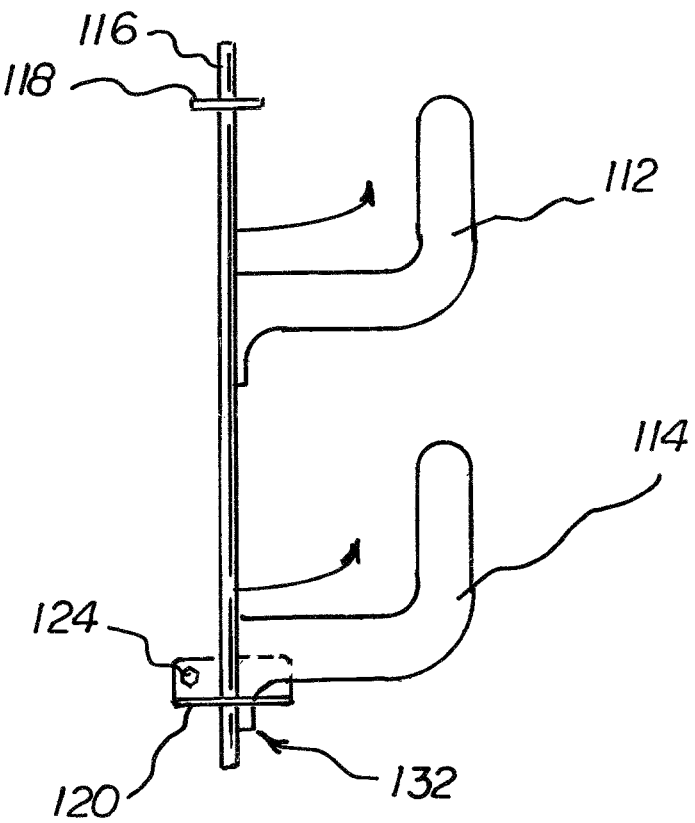
FIG. 4 is a side elevational view of the hose storage rack.

Referring now to FIGS. 3-4, in operation, each support member 100 is configured to lift up to remove the boss 132 from the intersecting slots 130, rotate to a desired position, and lower down to insert the boss 132 into a desired slot of the intersecting slots 130. The intersecting slots 130 form a T-configuration for three positions to secure each supporting member 100 one hundred eighty (180) degrees to either side.

The boss 132 is aligned with the lower support arm 114 so that the support member 100 can be easily positioned. For example, when the rack is ready for use, the support members 100 are rotated ninety (90) degrees until they are orthogonal and extending away from the equipment 108. The boss 132 of the lower arm 114 will then be aligned with the appropriate slot so that as the support member 100 is lowered down, the boss 132 slides into the desired slot. The boss 132 will extend down past the retainer 120 to prevent the support member 100 from rotating any further to either side. The boss 132 tapers into the lower edge of the lower arm 114, which lower edge of the lower arm 114 supports the weight of the support member 100 and hose 122.

Once the support members 100 are positioned in the desired location, the hose 122 is loaded on to the arms 112, 114. Often times the hose 122 is corrugated with groves along its length. Thus, to prevent the hose 122 from sliding, the upper arm 112 and the lower arm 144 each have a thickness for engaging a groove between corrugations in the hose 122. In addition, the upper arm 112 and the lower arm 114 each having an elbow portion that curves upward to prevent the hose 122 from rolling off the respective arm and are configured to cradle the hose 122.

The rack also includes an upper bracket 118 having an aperture 128 for receiving an upper portion of the vertical member 116, where the aperture 128 is aligned with an intersection of the intersecting slots 130 of the retainer 120. In this particular embodiment the upper bracket 118 is planar and adapted to be secured to the top of the equipment 108 using an adjustment slot 126. The adjustment slot 126 allows the upper bracket to be moved so that the vertical member 116 can be positioned in a plumb upright orientation. The support members 100 are spaced to support the hose 122 spanning between the upper arm 112 of a first member and the upper arm 112 of the second member, and sequentially the lower arm 114 of the second member and the lower arm 114 of the first member as shown in FIG. 1.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A folding hose storage rack, the rack comprising:
two spaced apart support members, each support member having:
a vertical member configured to rotate about a vertical axis;
an upper arm extending outward from the vertical member;
a lower arm extending outward from the vertical member, wherein the lower arm is aligned under the upper arm;
a boss along a lower edge of the lower arm;
a retainer coupled to a lower portion of the vertical member and having intersecting slots completely therethrough such that each slot is configured to receive the boss to prevent the support member from rotating; and
an upper bracket coupled to an upper portion of the vertical member above the upper arm, the upper bracket having an aperture for receiving only the vertical member therein;
wherein each support member is configured to lift up to remove the boss from the intersecting slots, rotate to a desired position, and lower down to insert the boss into a desired slot of the intersecting slots.

2. The rack of claim 1, wherein the upper arm and the lower arm each having a thickness for engaging a groove between corrugations in a hose.

3. The rack of claim 1, wherein the upper arm and the lower arm each having an elbow portion to prevent a hose from rolling off an end of the respective arm.

4. The rack of claim 1, wherein the vertical member comprises a cylindrical rod.

5. The rack of claim 1, further comprising a hose with corrugations spanning between the two spaced apart support members, wherein the hose is configured for use with a debris tank.

6. The rack of claim 5, wherein the rack is configured to be secured proximate a debris tank.

7. the rack of claim 6, wherein the support members are spaced apart to support the hose spanning between the upper arm of a first support member and the upper arm of the second support member, and sequentially the lower arm of the second support member and the lower arm of the first support member.

8. The rack of claim 1, wherein the intersecting slots of the receiver are orthogonal to one another.

9. The rack of the claim 1, wherein the intersecting slots form a T-configuration for three positions to rotate and secure each support member 90 degrees to either side.

* * * * *